Aug. 24, 1965
C. WILSON
3,202,116
SERVING TRAY FOR AUTOMOBILES
Filed Dec. 28, 1964
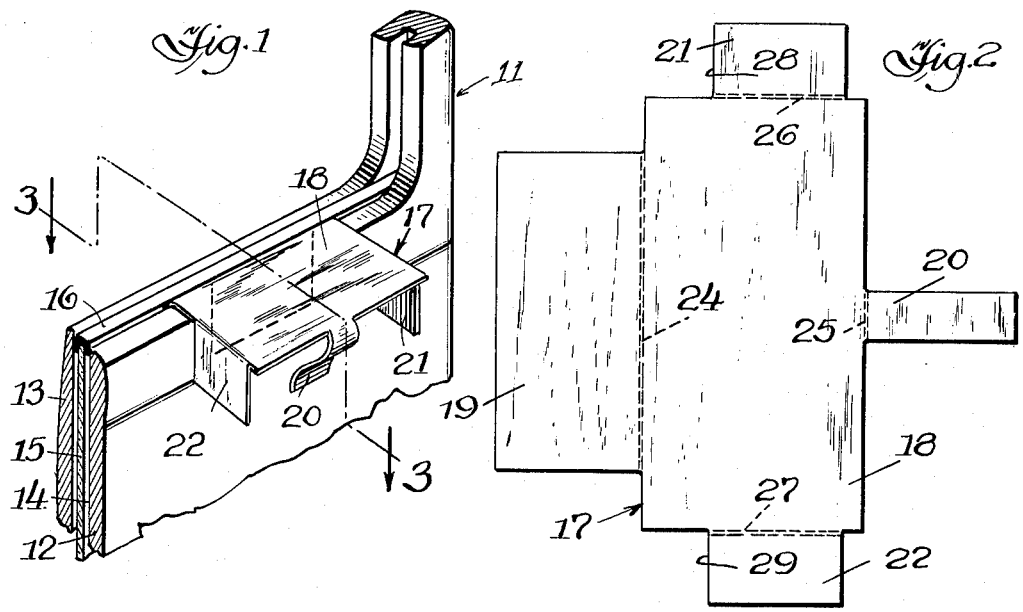
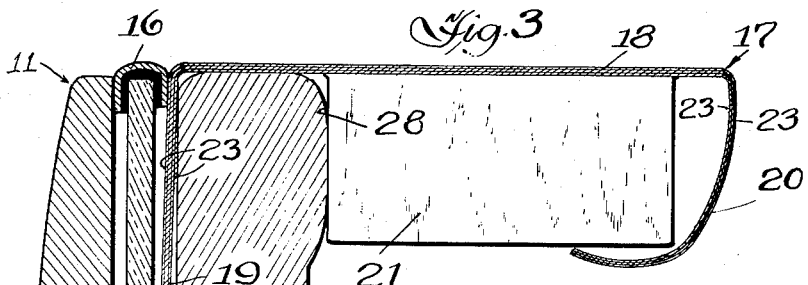
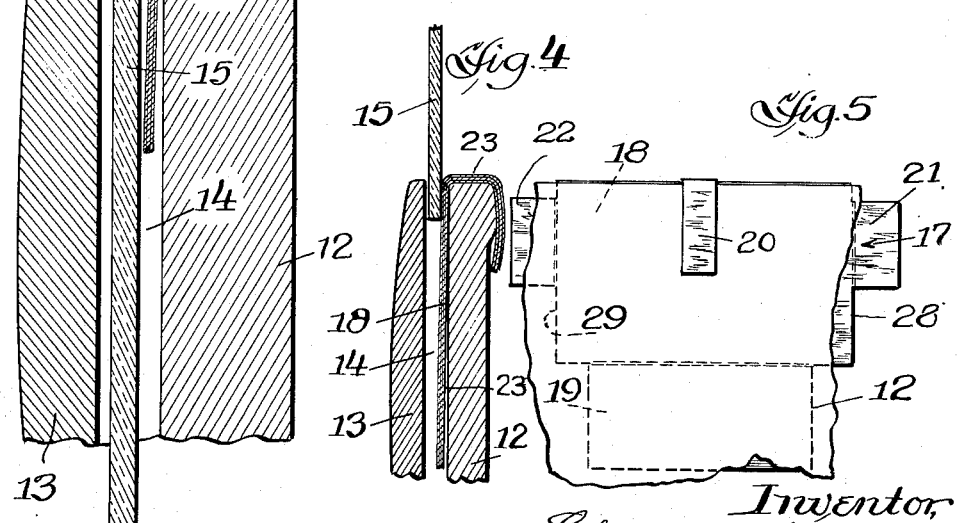
Inventor,
Christian Wilson,
Benjamin Schlosser Atty

United States Patent Office 3,202,116
Patented Aug. 24, 1965

3,202,116
SERVING TRAY FOR AUTOMOBILES
Christian Wilson, 1590 Hawthorne Lane,
Highland Park, Ill.
Filed Dec. 28, 1964, Ser. No. 421,577
4 Claims. (Cl. 108—46)

This invention relates to a serving tray for automobiles, and is particularly concerned with a tray that may be retained in storage position within the window well of an automobile door without interfering with the normal vertical movement of the window, and is always accessible for use.

The advantages of a serving tray when people eat and drink while seated in an automobile are well known in connection with restaurants of the drive-in type. Usually a serving tray is temporarily mounted on one door of the automobile, and the person sitting by that particular door is the only one that has a solid support to hold his drink while is is eating, or his food while he is drinking. The other occupants of the automobile have to hold a glass or cup in one hand, or between their knees, while they struggle with their food.

Although a serving tray constructed in accordance with the present invention is not permanently attached to any part of the automobile door, a tray can be mounted in each door of the automobile and kept in storage position within the window well as a permanent installation. The serving tray is made of a sheet of flat, rigid material such as, for example, metal or plastic, preferably covered on each flat surface with flexible sheet material adapted to form hinges between a body section and extensions projecting from the edges of said body section. When said body section and extensions are in coplanar relationship they fit between the window and the door frame within the window well of an automobile door. When the tray is in storage position in the window well of an automobile door only a small handle is visible, and it does not detract from the appearance of the interior of the automobile. The handle is preferably flexible, and may be shaped manually. It does not project inwardly from the door far enough to interfere with the comfort of the person sitting next to the door, and yet makes the serving tray readily accessible for use.

The tray includes a body section that may be pulled upwardly by the handle, and then bent inwardly into horizontal position over the door frame, whether the adjacent window is open or closed. Two support sections hinged to opposite edges of the tray drop downwardly by gravity when the body section of the tray is moved into the horizontal position in which it is used. One edge of each support section abuts the upholstered side of the door to help hold the tray securely with its body section in horizontal position.

The advantages of the individual trays for each door of an automobile are not limited to the added comfort of persons eating at a drive-in. The trays may be utilized at a picnic when a table is not available, or when a sudden rain makes the shelter of the automobile more inviting than a wet bench to a group of hungry people. The trays may also be used sometimes even when the automobile is moving.

The structure by means of which the above mentioned and other advantages of the invention are attained will be fully described in the following specification, taken in conjunction with the accompanying drawings showing a preferred illustrative embodiment of the invention, in which:

FIG. 1 is a perspective view of a serving tray with its body section in its horizontal position of use on the inner frame of the door of an automobile;

FIG. 2 is a top plan view of the serving tray;

FIG. 3 is a cross sectional view, taken along the line 3—3 of FIG. 1;

FIG. 4 is a cross sectional view showing the serving tray in its storage position with its parts in coplanar relationship within the window well of an automobile door; and FIG. 5 is a fragmentary front elevational view of the inner frame of an automobile door with parts broken away, showing the serving tray in storage position.

Referring to the drawings, a conventional door 11 of an automobile comprises an inner frame 12 and an outer frame 13 separated by a window well 14 in which a glass or plastic window 15 is vertically movable. A channel 16 is mounted on the upper edge of the window 15 to keep it from rattling. This structure is conventional, and is shown only to illustrate the environment in which the serving tray 17 is used.

The serving tray comprises a flat body section 18, preferably of rectangular shape, having a tail section 19 extending from one longitudinal edge, a handle 20 extending from the opposite edge, and support sections 21 and 22 extending from its opposite ends. The body section 18 is made from a sheet of metal or plastic thin enough to fit between the inner frame 12 and the window 15 within the window well of an automobile door. The body section 18 and its support sections must be rigid enough to support the dishes of food that are placed on the body section when the tray is being used. If desired, the body section may be embossed to form shallow ribs to provide additional rigidity. If ribs are provided, they preferably extend around the outer edges of the body section 18. The tail section 19, handle 20, and support sections 21 and 22 may be integral with the body section, but preferably are formed separately, and are hinged to the body section by flexible sheets 23 of plastic material secured to both flat surfaces of the body section and each of the extensions. A self hinge is formed between the body section and each of the extensions that is integral with the body section. In the integral structure, the hinges are formed by cutting a groove along the joint between the body section and the extension. The material beneath the groove is thin enough to make it flexible.

Each of the extensions 19, 20, 21 and 22 is spaced from the adjacent edge of the body section far enough to have the sheet material 23 form flexible hinges 24, 25, 26 and 27 between the body section 18 and the tail section 19, the handle 20, the support section 21, and the support section 22, respectively. The sheets 23 may be of any suitable fabric, but preferably are a plastic fabric that can be kept clean easily by wiping the surface with a damp cloth. The hinges, whether they are integral with the tray structure, or are formed by the flexible fabric, permit the body section and its extensions, except the handle 20, to be spread out in coplanar relationship so that the tray may be dropped into its storage position in the window well 14 between the inner frame 12 and the window 15.

When the serving tray is in its storage position within the window well of an automobile door, the handle 20 extends across the top of the inner frame 12 forming the bottom of the window opening. The handle projects inwardly far enough to be grasped by the hand of a user. The handle is pulled upwardly until the hinge 24 clears the top of inner frame 12 at the bottom of the window opening. The body section 18 is then moved pivotally inwardly over the top of the inner frame 12. During the inward pivotal movement of the body section 18, the weight of the support sections 21 and 22 cause them to move downwardly about their respective flexible hinges 26 and 27.

The edge 28 of the support section 21, and the edge 29 of the support section 22, are each spaced from the adjacent longitudinal edge of the body section 18 a distance equal to the width of the inner frame 12 of the automobile door. The edges 28 and 29 of the support sections 21 and 22 abut the inner surface of the inner door frame when the body section of the serving tray is in horizontal position. The support sections 21 and 22 cooperate with the tail section 19 to hold the body section 18 in a horizontal plane. When the serving tray is to be moved back into its storage position within the window well 14, the body section 18 is lifted into vertical position by pulling force exerted on the handle 20. While the serving tray is held in its uppermost position, the support sections 21 and 22 are manually spread outwardly until they are coplanar with the body section 18, and the tray is then dropped into the window well 14. The handle 20 engages the top of the inner door frame to prevent the serving tray from falling all the way into the window well.

Although I have described a preferred embodiment of the invention in considerable detail, it will be understood that the description thereof is intended to be illustrative, rather than restrictive, as many details of structure may be modified or changed without departing from the spirit or scope of the invention. Accordingly, I do not desire to be restricted to the exact structure described.

I claim:

1. A serving tray for automobiles comprising a rigid body section, a handle projecting from one edge of said body section, a tail section hinged to the opposite edge of said body section, said tail section being insertable into the window well of an automobile door, and support sections hinged to the opposite ends of said body section, said support sections being adapted to engage the inner frame of an automobile door and cooperate with said tail section to hold said body section in horizontal position when said tail section is positioned within the window well of an automobile door.

2. A serving tray comprising a body section, a plurality of extensions projecting from different edges of said body section, and a sheet of fabric adhered to said body section and each of said extensions, said fabric serving as a hinge between each of said extensions and said body section, said body section and extensions fitting within the window well of an automobile door in coplanar relationship, two of said extensions being adapted to move out of coplanar relationship by gravity when said body section is lifted above said window well and moved pivotally about the hinge between it and a third extension positioned in the window well, said two extensions engaging the inner frame of the automobile door to support said body section in horizontal position.

3. A serving tray for automobiles comprising a body section, and an extension hinged to each of three edges of said body section, said body section and said extensions fitting within the window well of an automobile door in coplanar relationship, said body section being movable into horizontal position with one of said extensions positioned in said window well, said two other extensions being movable by gravity into supporting position for said body section when said body section is moved into its horizontal position.

4. A serving tray for automobiles comprising a rigid body section, a tail section hinged to one edge of said body section, and a support section hinged to an adjacent edge of said body section, said body section, tail section, and support section fitting within the window well of an automobile door in coplanar relationship, said body section being movable into horizontal position about the hinge between it and said tail section when it is lifted out of said window well, said support section being adapted to move into support position automatically when said body section is lifted from said window well and moved into horizontal position.

References Cited by the Examiner

UNITED STATES PATENTS

| | | | |
|---|---|---|---|
| 2,723,887 | 11/55 | Kowalsky | 108—134 |
| 2,770,513 | 11/56 | Brown | 220—18 |
| 2,961,279 | 11/60 | Kjellstorm | 108—146 X |
| 3,125,969 | 3/64 | Tallent | 108—46 |
| 3,151,578 | 10/64 | Jones | 108—64 |

FOREIGN PATENTS 214,541   3/58   Australia.

FRANK B. SHERRY, *Primary Examiner.*